United States Patent
Hirasawa et al.

(10) Patent No.: US 10,146,075 B2
(45) Date of Patent: Dec. 4, 2018

(54) DISPLAY DEVICE

(71) Applicant: SONY CORPORATION, Tokyo (JP)

(72) Inventors: Takeaki Hirasawa, Tokyo (JP); Hisanori Tsuboi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 90 days.

(21) Appl. No.: 15/029,999

(22) PCT Filed: Dec. 12, 2014

(86) PCT No.: PCT/JP2014/082931
§ 371 (c)(1),
(2) Date: Sep. 7, 2016

(87) PCT Pub. No.: WO2015/098565
PCT Pub. Date: Jul. 2, 2015

(65) Prior Publication Data
US 2016/0370641 A1  Dec. 22, 2016

(30) Foreign Application Priority Data

Dec. 24, 2013 (JP) ................. 2013-264895

(51) Int. Cl.
G02F 1/1333 (2006.01)
G06F 1/16 (2006.01)
F21V 8/00 (2006.01)

(52) U.S. Cl.
CPC ...... *G02F 1/133308* (2013.01); *G06F 1/1626* (2013.01); *G02B 6/0055* (2013.01);
(Continued)

(58) Field of Classification Search
CPC .... G06F 1/1333; G06F 1/1626; G06F 1/1637;
G06F 1/181; G06F 1/1601; G02F 2001/133314; G02F 2001/133331; G02F 2201/48; G02F 2202/28; G02F 2001/133317; G02F 1/133308; G02F 2001/133322; G02F 2001/133328; G02F 2201/07; G02F 1/133608; G02F 1/1339;
(Continued)

(56) References Cited

U.S. PATENT DOCUMENTS

| 6,597,113 | B1* | 7/2003 | Nitta ................. H01J 11/12 313/581 |
| 2011/0250460 | A1* | 10/2011 | Banba ............... C08G 65/336 428/429 |
| 2014/0300567 | A1* | 10/2014 | Inata ................... G06F 3/0488 345/173 |

FOREIGN PATENT DOCUMENTS

| JP | 2006-221058 A | 8/2006 |
| JP | 2006-330127 A | 12/2006 |

(Continued)

*Primary Examiner* — Dimary Lopez Cruz
*Assistant Examiner* — Ingrid Wright
(74) *Attorney, Agent, or Firm* — Chip Law Group

(57) ABSTRACT

There is provided a display device including: a display cell (20); a surrounding member (30) provided around the display cell (20); a cover film (10) provided on front side of the display cell (20) and the surrounding member (30); a relay member (40) provided on rear side of the display cell (20) and the surrounding member (30), and facing a margin between the display cell (20) and the surrounding member (30); and an adhesive layer (50) provided between the display cell (20) and the relay member (40), and between he surrounding member (30) and the relay member (40).

8 Claims, 20 Drawing Sheets

(52) U.S. Cl.
CPC .......... *G02B 6/0065* (2013.01); *G02B 6/0085* (2013.01); *G02F 2001/13332* (2013.01); *G02F 2001/133314* (2013.01); *G02F 2001/133317* (2013.01); *G02F 2001/133322* (2013.01); *G02F 2001/133328* (2013.01); *G02F 2001/133331* (2013.01); *G02F 2201/07* (2013.01); *G02F 2201/48* (2013.01); *G02F 2202/28* (2013.01)

(58) Field of Classification Search
CPC ................ G02F 1/1341; G02F 1/1333; G02F 2001/13332; G02F 1/13338; G02B 6/0055; G02B 2201/48; G02B 6/0065; G02B 6/0085
See application file for complete search history.

(56) References Cited

FOREIGN PATENT DOCUMENTS

| | | | |
|---|---|---|---|
| JP | 2009-008703 | A | 1/2009 |
| JP | 2009-080165 | A | 4/2009 |
| JP | 2011-022769 | A | 2/2011 |
| JP | 2012-168257 | A | 9/2012 |
| JP | 2013-190576 | A | 9/2013 |

\* cited by examiner

[FIG. 1]
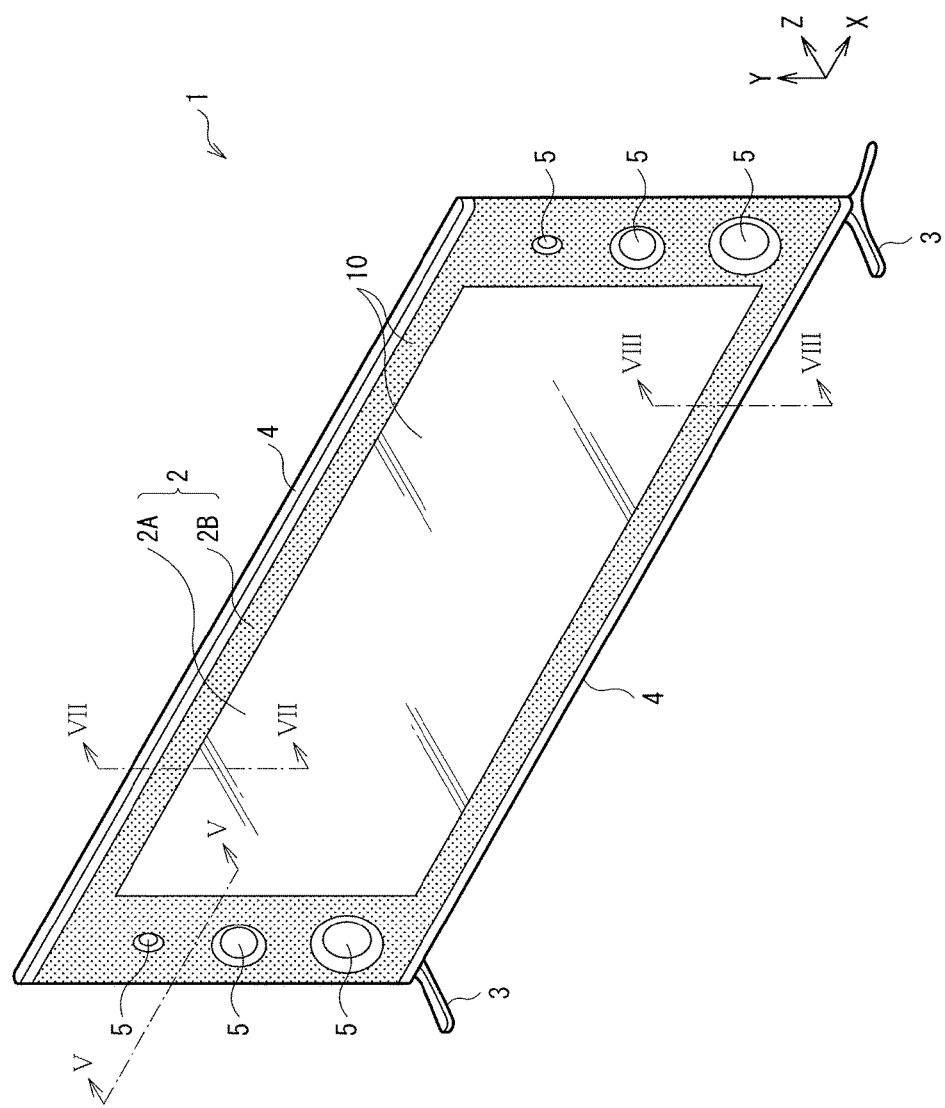

[ FIG. 2 ]
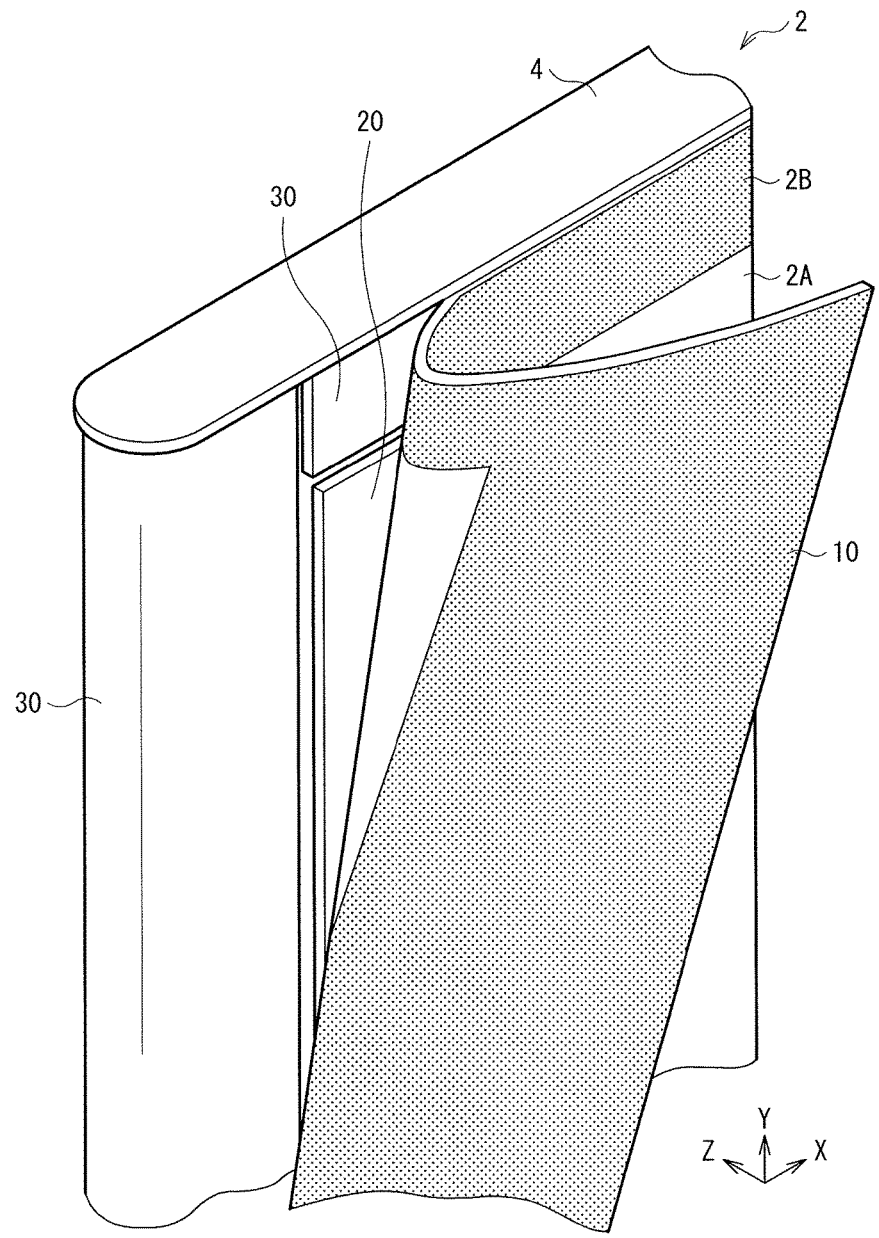

[ FIG. 3 ]
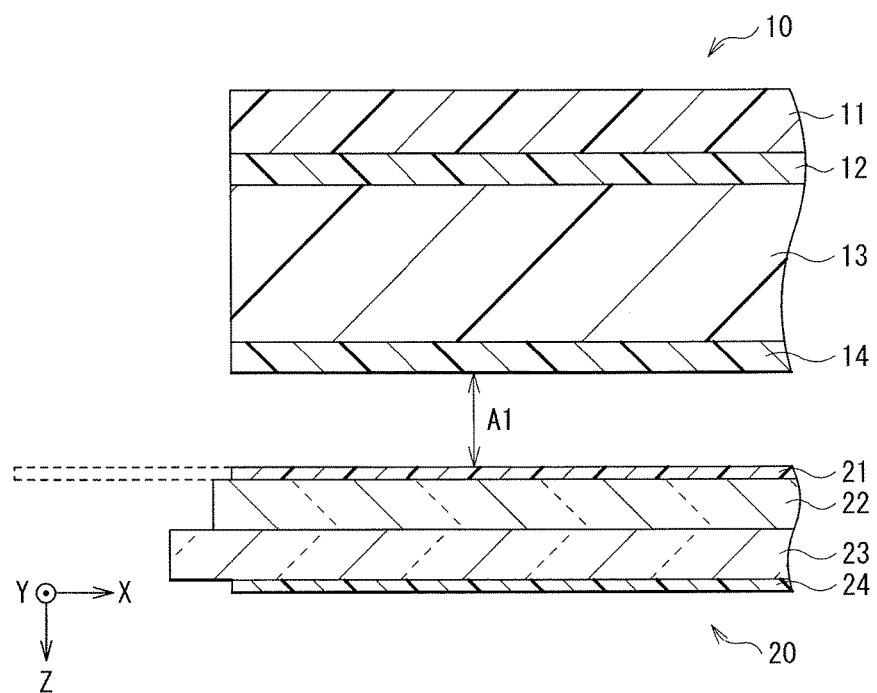

[FIG. 4]
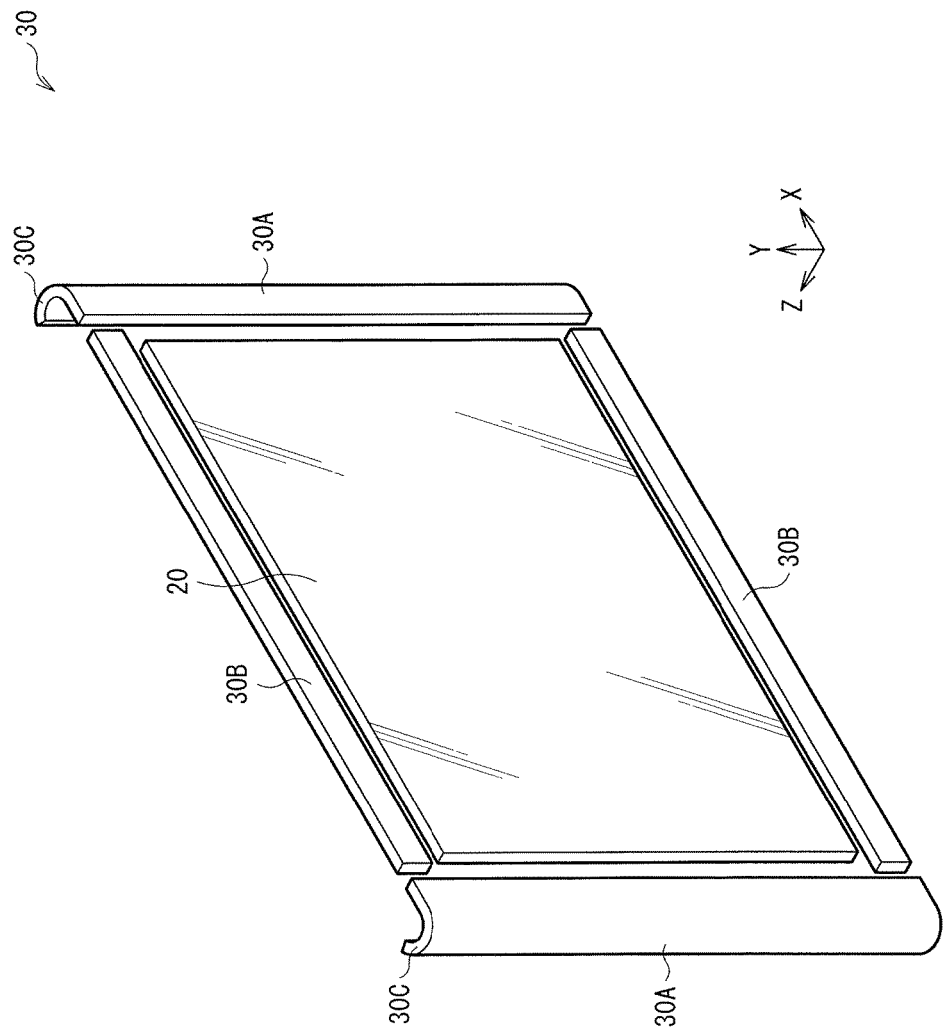

[FIG. 5]
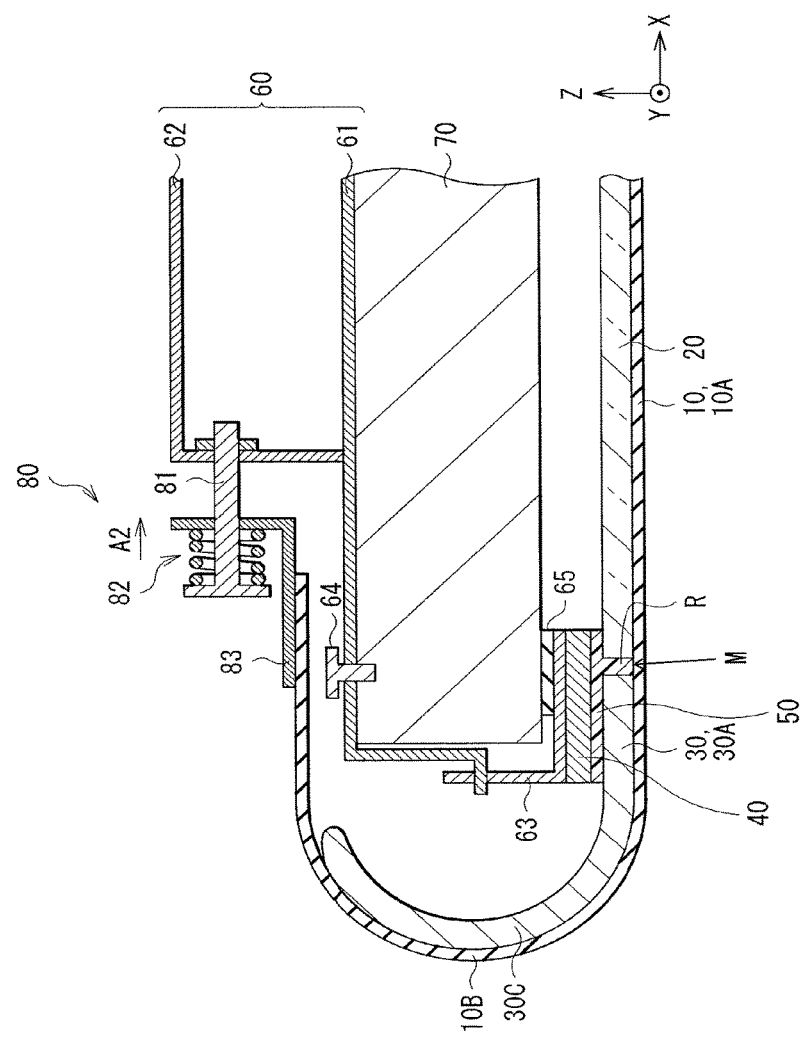

[ FIG. 6 ]
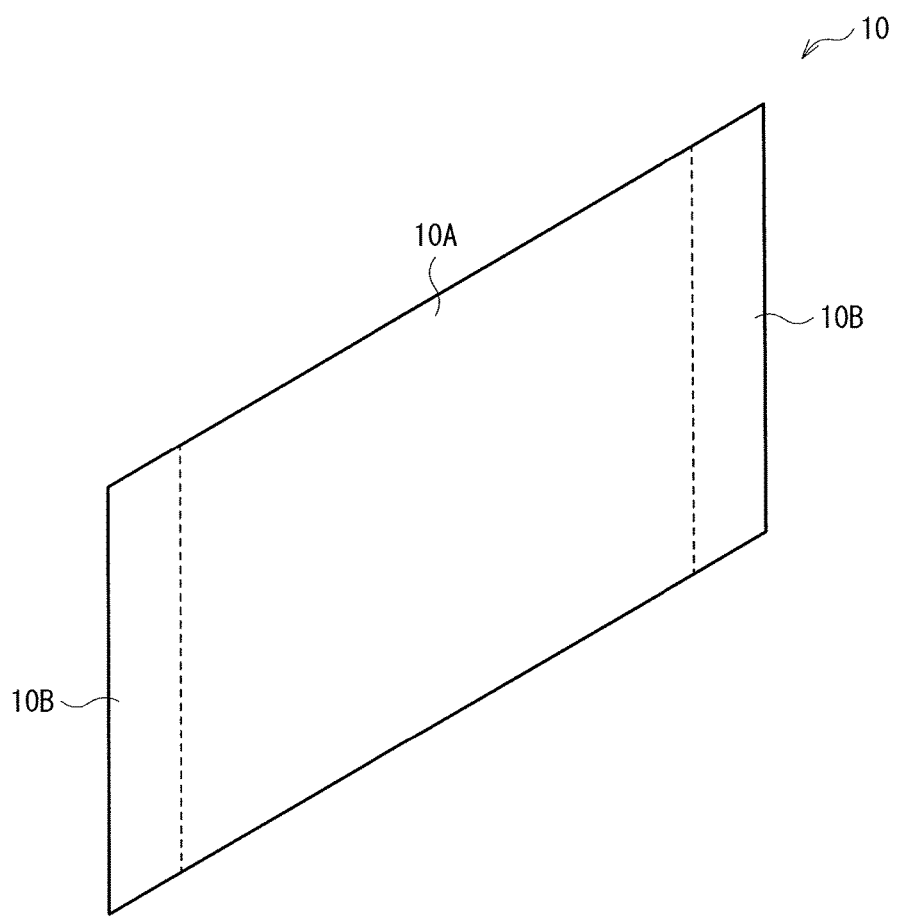

[ FIG. 7 ]
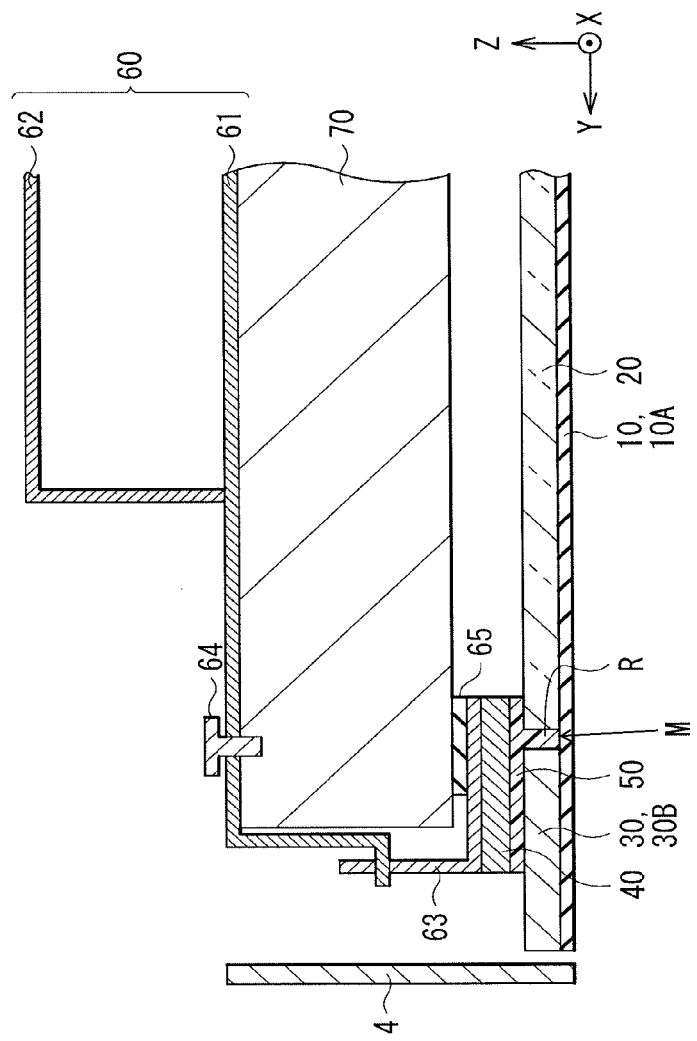

[FIG. 8]
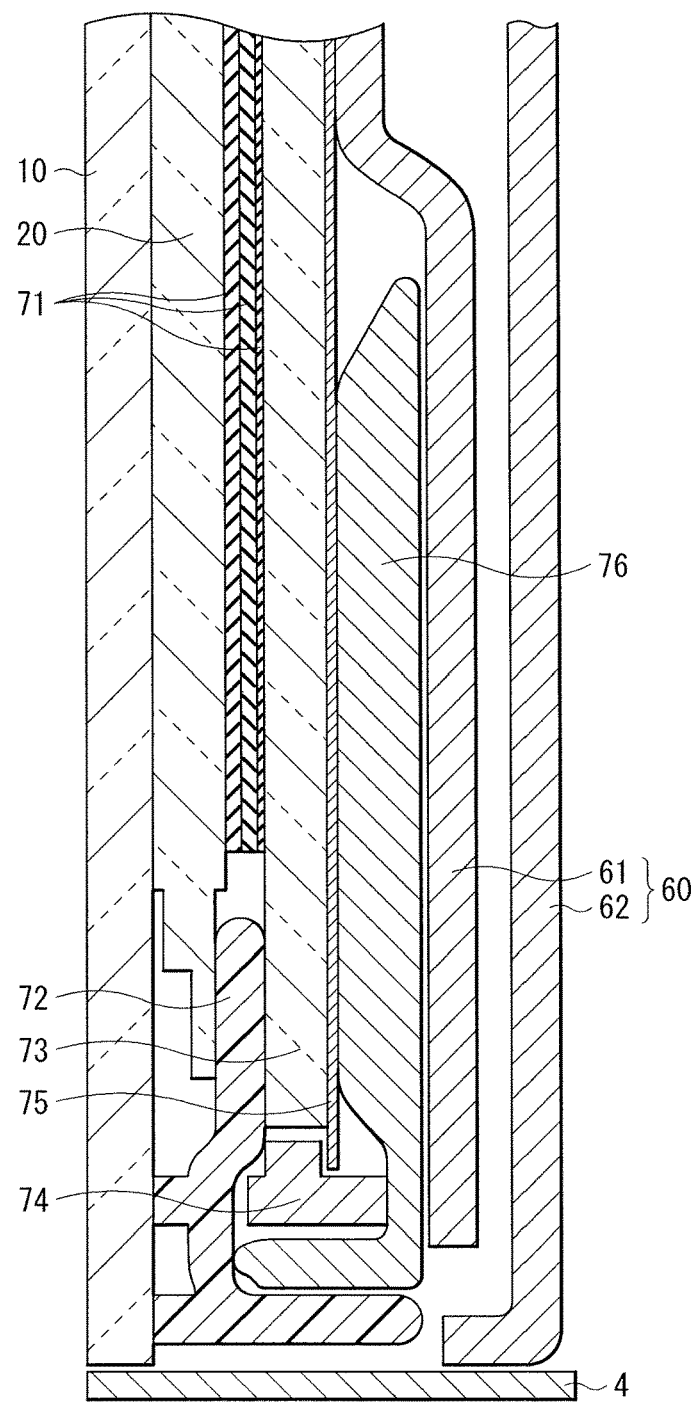

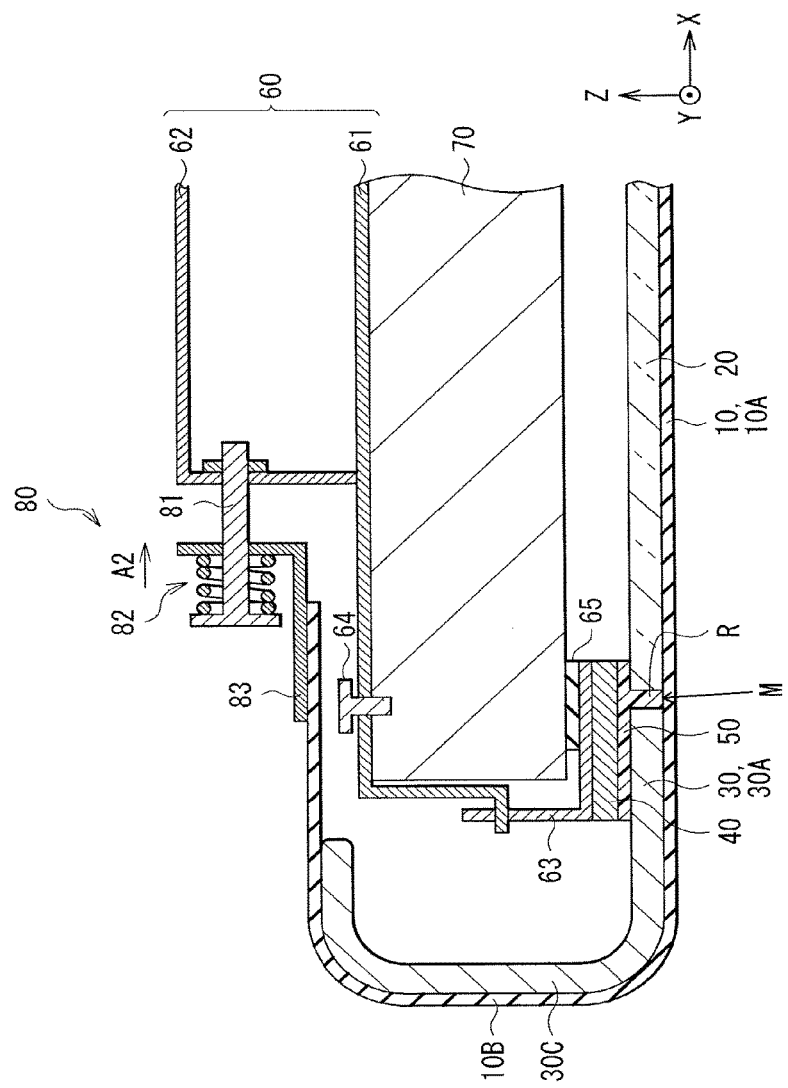
[ FIG. 9 ]

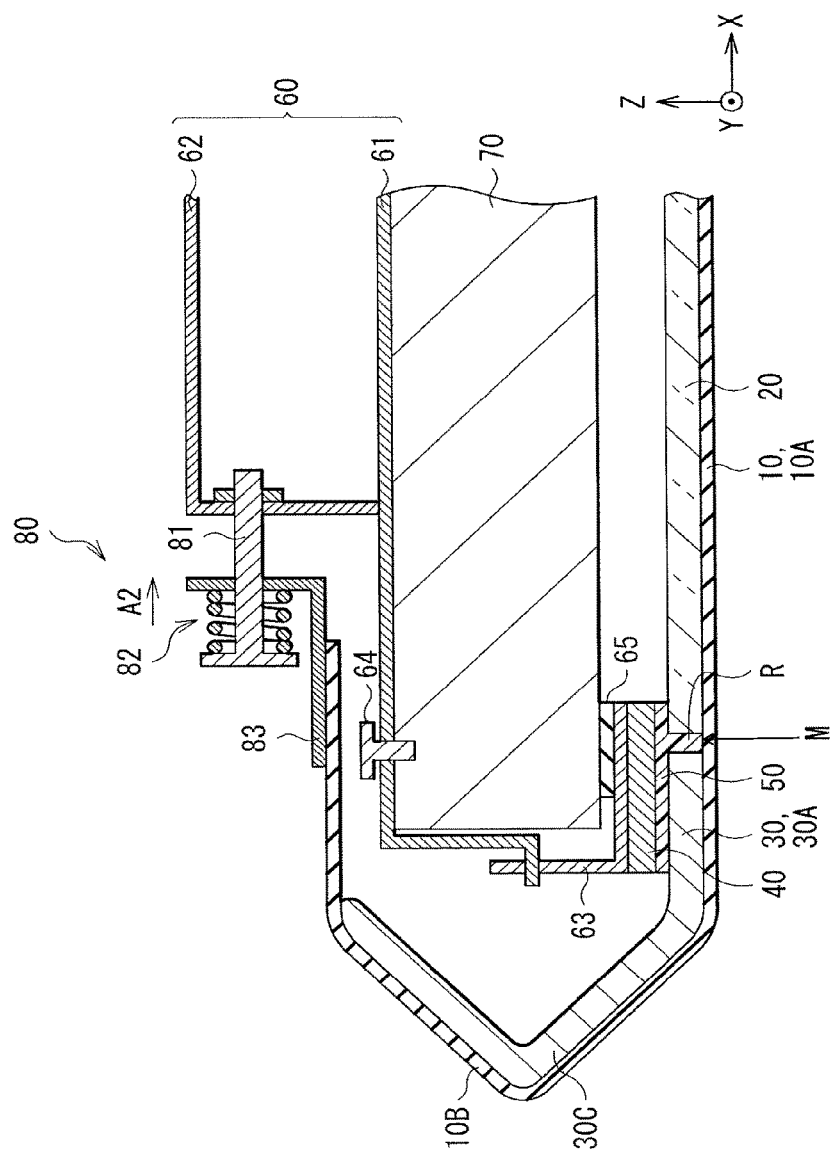
[ FIG. 10 ]

[ FIG. 11 ]
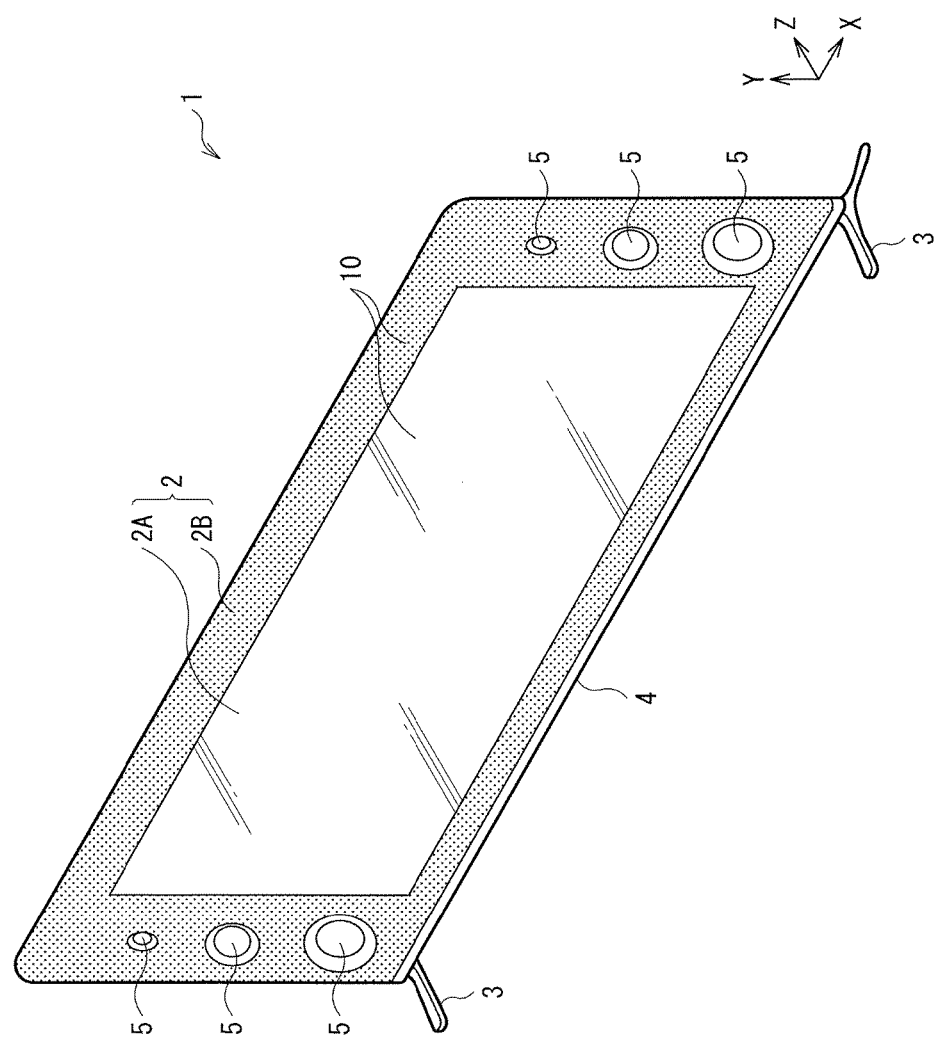

[ FIG. 12 ]
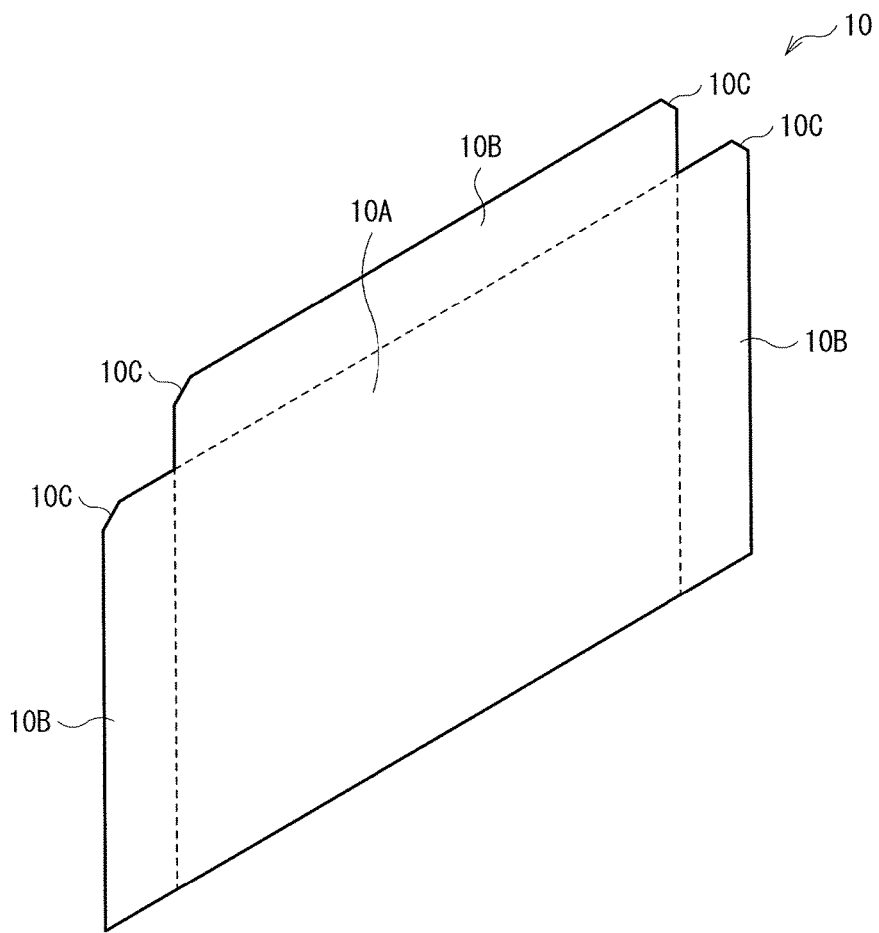

[ FIG. 13 ]
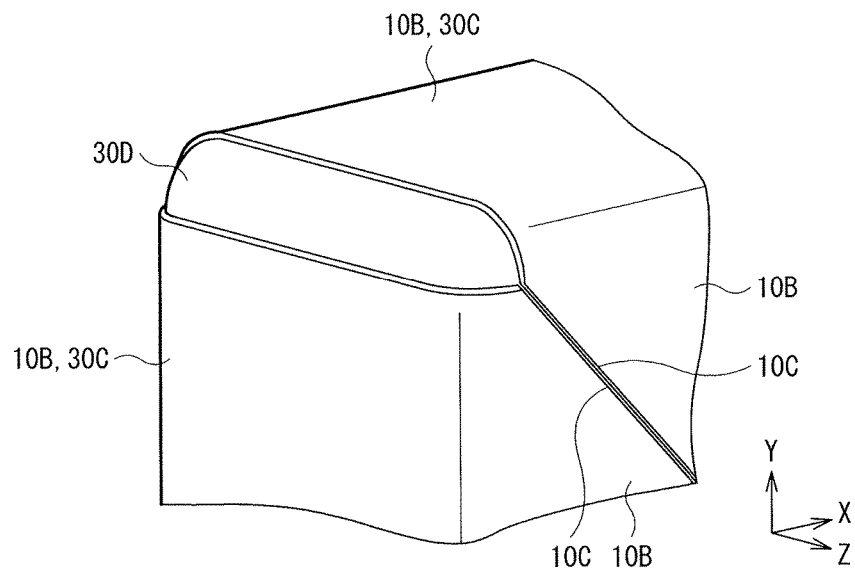
[ FIG. 14 ]
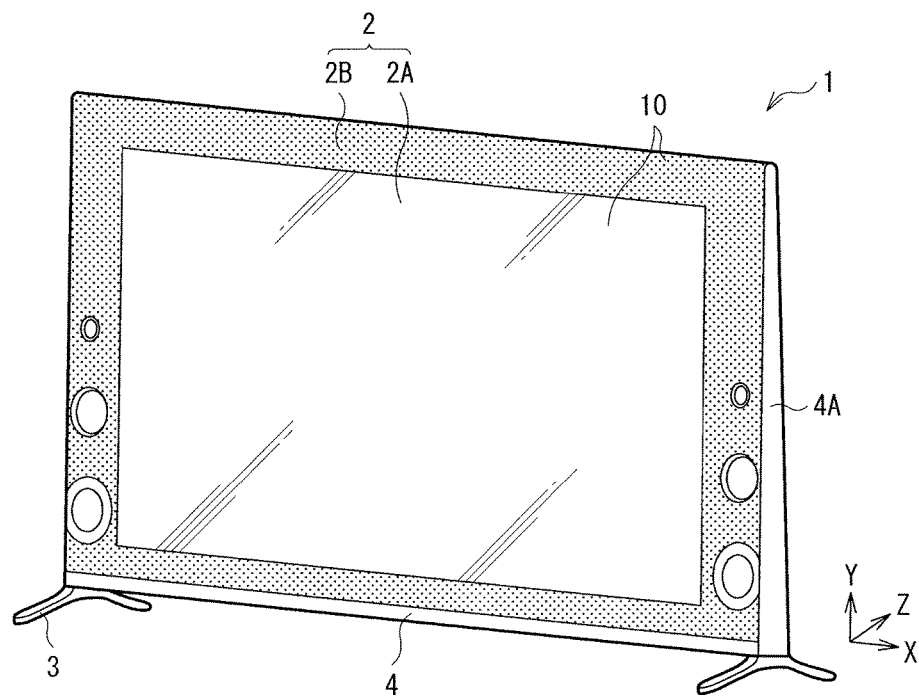

[ FIG. 15 ]
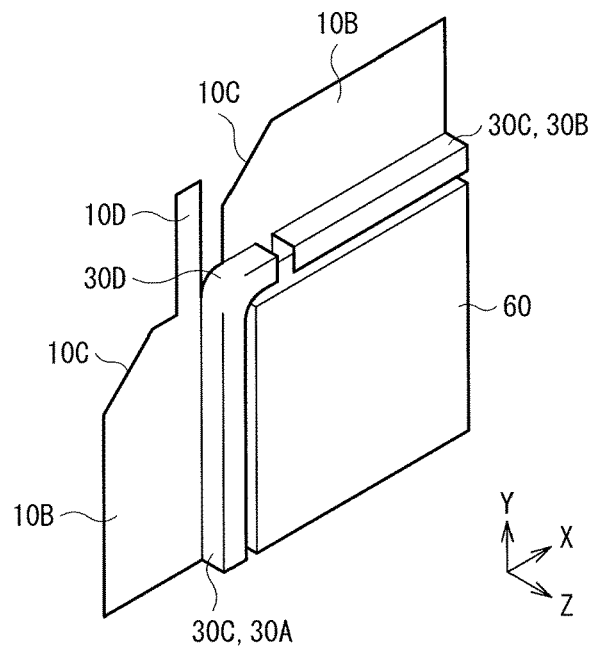
[ FIG. 16 ]
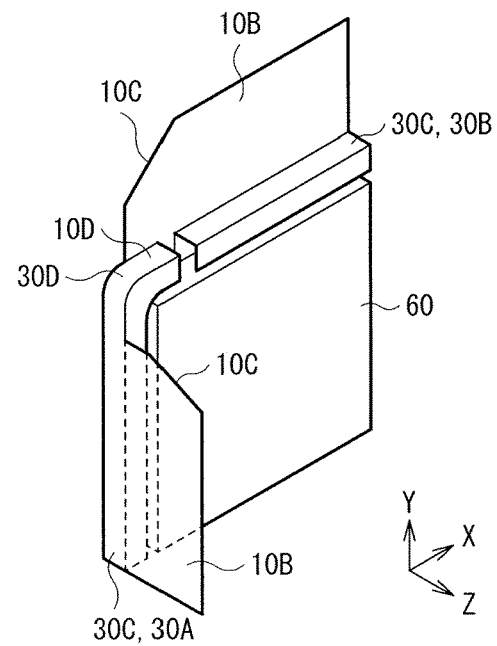

[ FIG. 17 ]
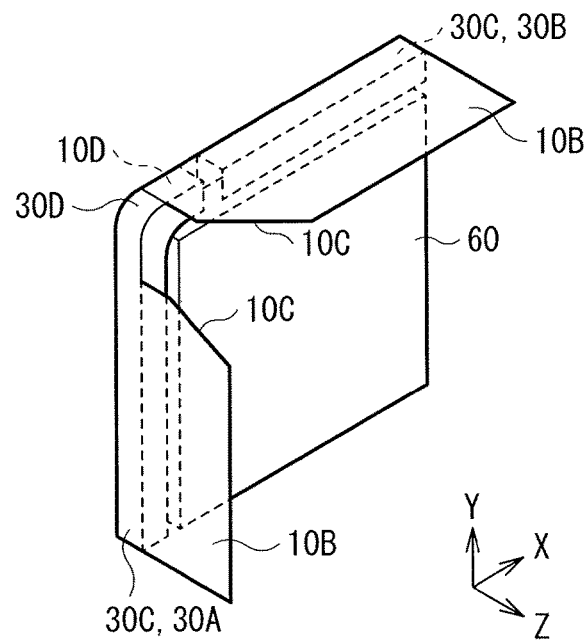
[ FIG. 18 ]
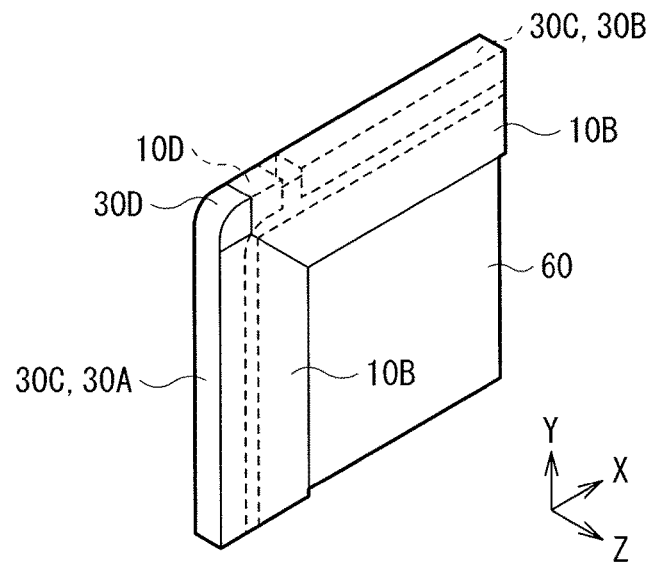

[ FIG. 19 ]
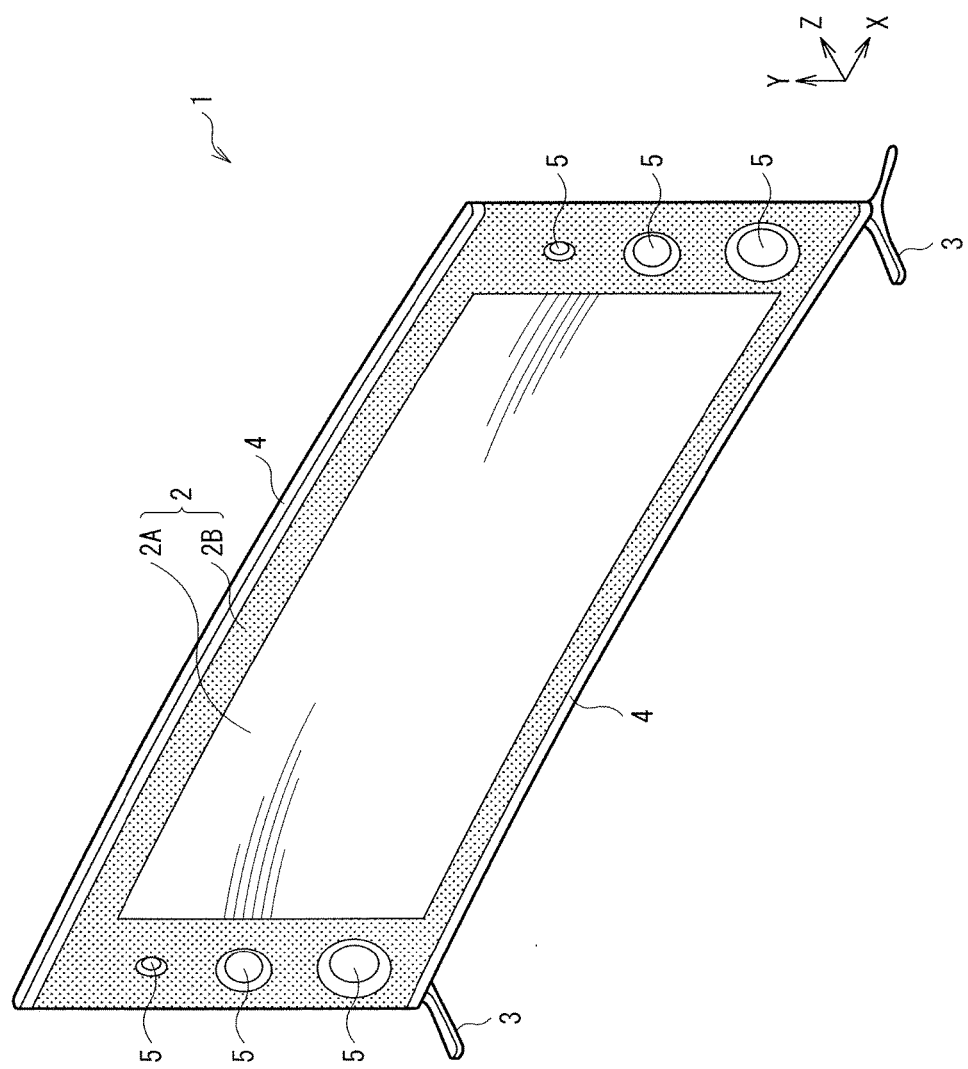

[ FIG. 20 ]
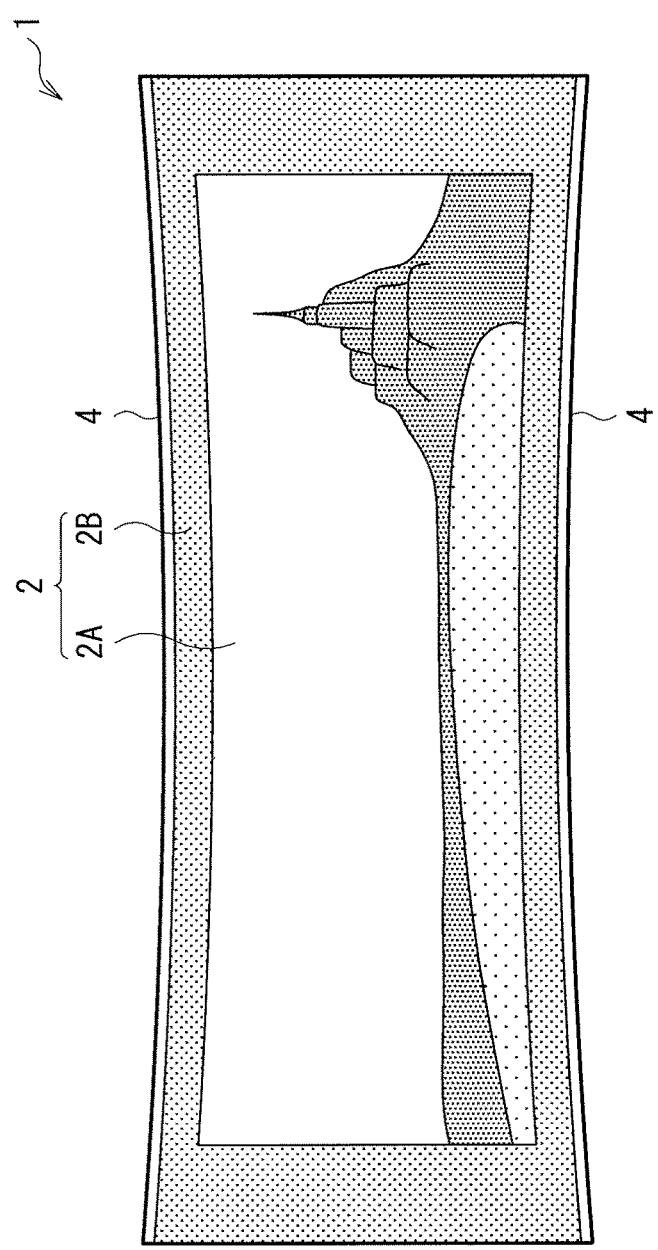

[ FIG. 21 ]
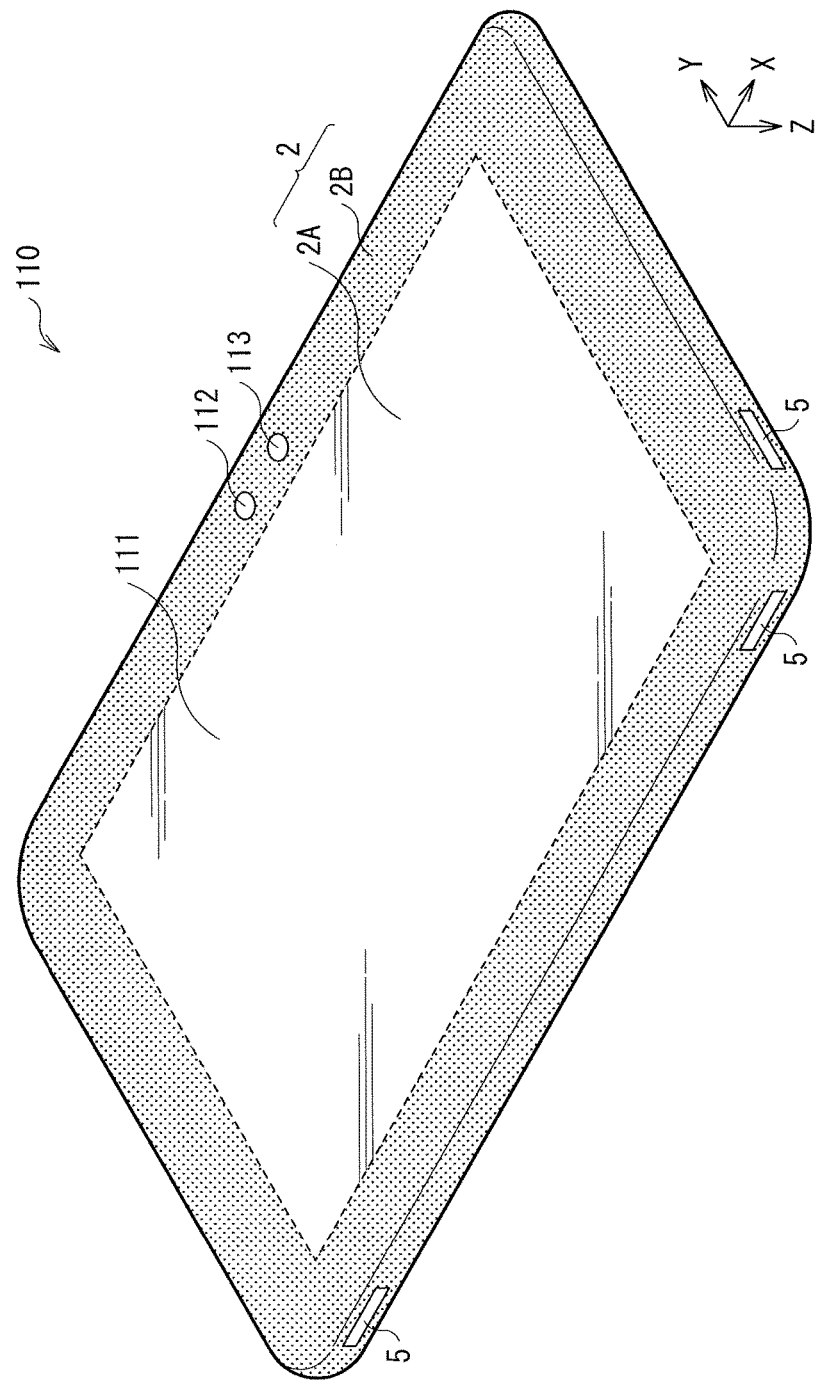

[ FIG. 22 ]
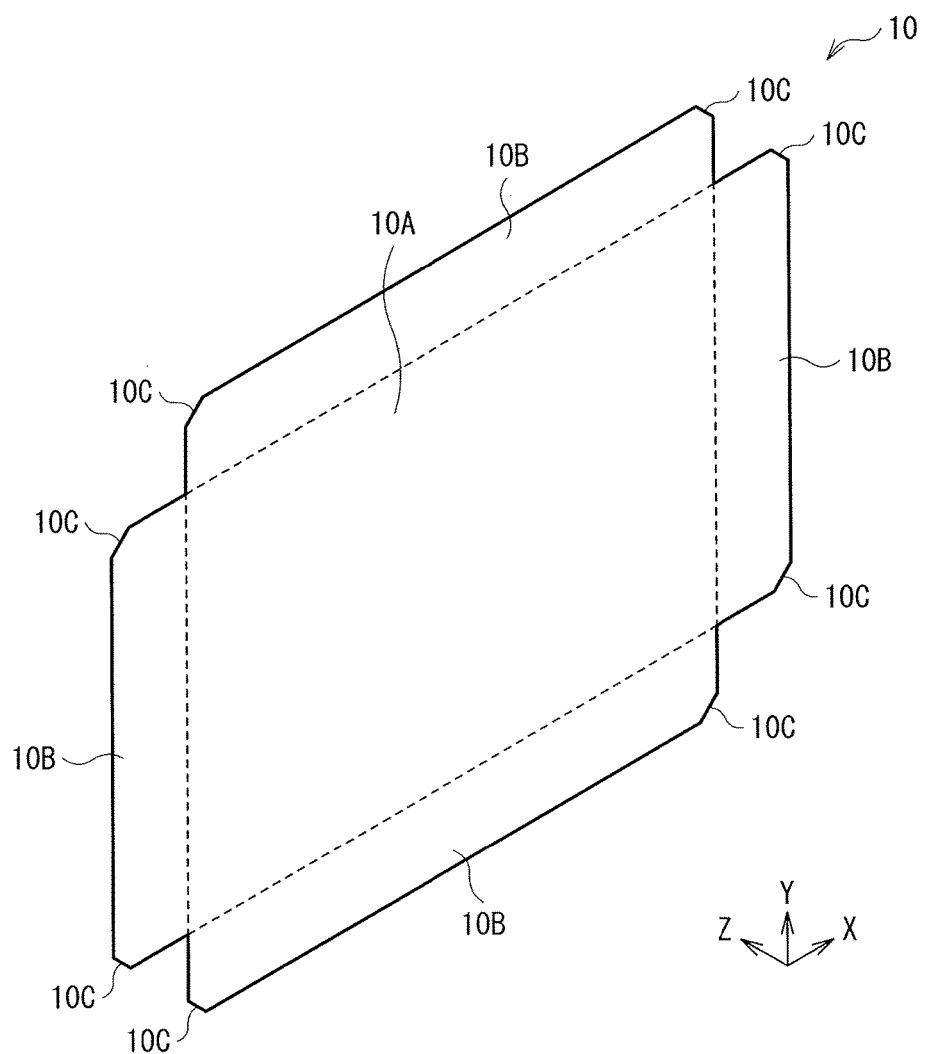

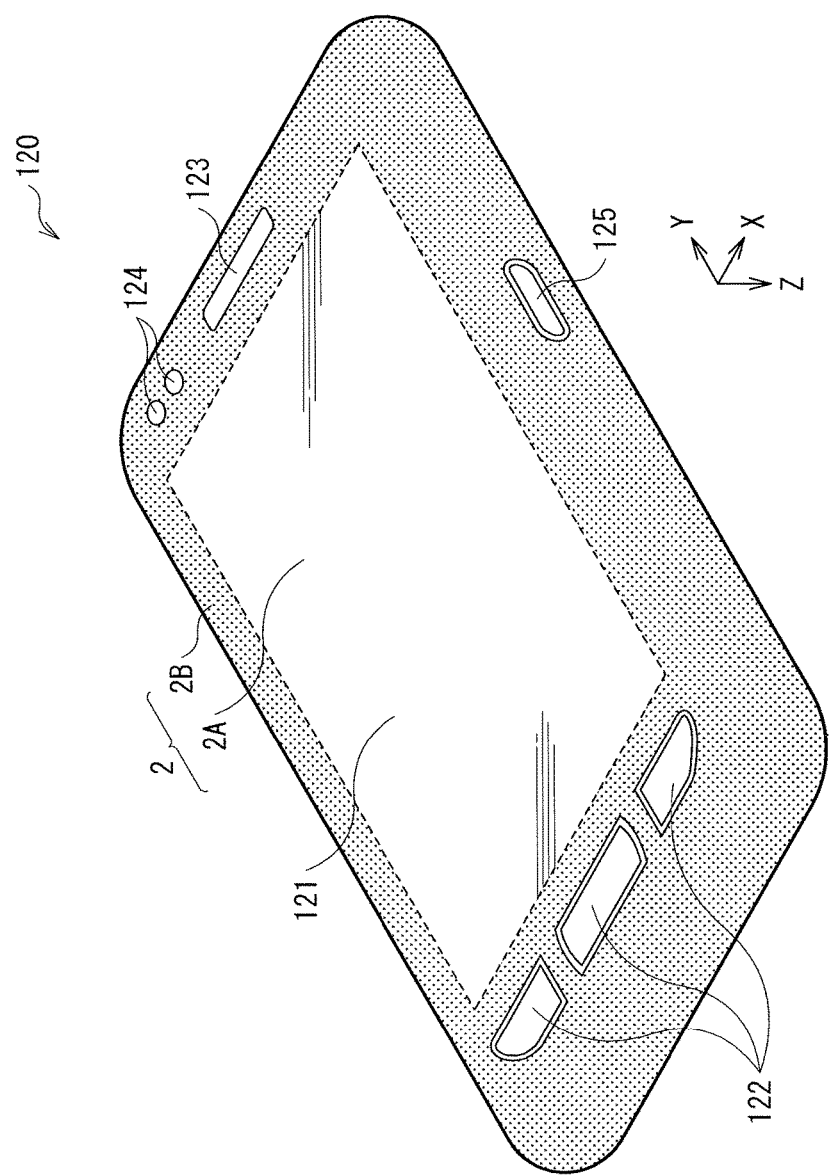
[ FIG. 23 ]

DISPLAY DEVICE

TECHNICAL FIELD

The disclosure relates to a display device such as a television receiver, a monitor, and a portable device.

BACKGROUND ART

In display devices such at television sets and monitors, for purposes of size and weight reduction, a proposal has been made to attach a cover film to a front surface of a display cell, allowing the cover film to support the display cell (for example, refer to Patent Literature 1). A frame-shaped surrounding member (a protection member) may be provided around the display cell. A back chassis may be disposed behind the display cell. The cover film may be attached from the front surface of the display cell to a rear surface of the back chassis through the surrounding member.

CITATION LIST

Patent Literature

Patent Literature 1: JP 2013-190576A

SUMMARY OF INVENTION

The use of such a cover film may involve possibilities of occurrence of deformities such as a level difference in a margin between the display cell and the surrounding member, and there has been still room for improvement.

It is therefore desirable to provide a display device that makes it possible to reduce deformities such as a level difference that occur in a margin between a display cell and a surrounding member when a cover film is attached to a front surface of the display cell.

A display device according to an embodiment of the disclosure includes component (A) to (E) as follows.

(A) a display cell
(B) a surrounding member provided around the display cell
(C) a cover film provided on front side of the display cell and the surrounding member
(D) a relay member provided an real side of the display cell and the surrounding member, and facing a margin between the display cell and the surrounding member (E) an adhesive layer provided between the relay member and the display cell, and between the relay member and the surrounding member.

In the display device according to the embodiment of the disclosure, the relay member is provided behind the display cell, facing the margin between the display cell and the surrounding member. The adhesive layer is provided between the relay member and the display cell, and between the relay member and the surrounding member. Accordingly, in the margin between the display cell and the surrounding member, the cover film is backed and reinforced with the relay member and the adhesive layer. Thus, deformities such as a level difference are reduced.

According to the display device according to the embodiment of the disclosure, the relay member is provided behind the display cell, facing the margin between the display cell and the surrounding member. The adhesive layer is provided between the relay member and the display cell, and between the relay member and the surrounding member. Hence, it is possible to reduce deformities such as a level difference that occur in the margin between the display cell and the surrounding member.

It is to be noted that some effects described here are not necessarily limitative, and any of other effects described herein may be achieved.

BRIEF DESCRIPTION OF DRAWINGS

FIG. 1 is a perspective view of an appearance, viewed from front, of a display device according to an embodiment of the disclosure.

FIG. 2 is a perspective view of a cover film illustrated in FIG. 1, the cover film being partly torn off to allow an internal configuration to come into view.

FIG. 3 is a cross-sectional view of a stacked configuration of a display cell and the cover film illustrated in FIG. 2.

FIG. 4 is a perspective view of an arrangement example of the display cell and a surrounding member illustrated in FIG 2.

FIG. 5 is a cross-sectional view, taken along a line V-V, of a display panel illustrated in FIG. 1.

FIG. 6 is a perspective view of a configuration of the cover film illustrated in FIG. 1.

FIG. 7 is a cross-sectional view, taken along a line VII-VII, of the display panel illustrated in FIG. 1.

FIG. 8 is a cross-sectional view, taken along a line VIII-VIII, of the display panel illustrated in FIG. 1.

FIG. 9 is a cross-sectional view, taken along the line V-V, of a display panel in a display device according to a modification example 1.

FIG. 10 is a cross-sectional view taken along the line V-V, of a display panel in a display device according to a modification example 2.

FIG. 11 is a perspective view of an appearance, viewed from front, of a display device according to a modification example 3.

FIG. 12 is a perspective view of a configuration of a cover film illustrated in FIG. 11.

FIG. 13 is a perspective view of an attached state of the cover film illustrated in FIG. 12.

FIG. 14 is a perspective view of an appearance, viewed from front, of a display device according to a modification example 4.

FIG. 15 is a perspective view of a configuration of a cover film according to a modification example 5.

FIG. 16 is a perspective view of an attachment method of the cover film illustrated in FIG. 15, in order of a procedure.

FIG. 17 is a perspective view of a process following FIG. 16.

FIG. 18 is a perspective view of a process following FIG. 17.

FIG. 19 is a perspective view of an appearance, viewed from front, of a display device according to a modification example 6.

FIG. 20 is a front view of a schematically-illustrated display example in the display device illustrated in FIG. 19.

FIG. 21. is a perspective view of as appearance of a display device according to an application example 1.

FIG. 22 is a perspective view of a configuration of a cover film illustrated in FIG. 21.

FIG. 23 is a perspective view of an appearance of a display device according to an application example 2.

DESCRIPTION OF EMBODIMENTS

In the following, some embodiments of the disclosure are described in detail with reference to the drawings. Note that description is made in the following order.

1. Example Embodiment (an example in which right and left sides of display cell are covered with extended parts of a cover film)
2. Modification Example 1 (an example in which a side surface of a surrounding member is shaped to form three sides of a rectangle with rounded corners)
3. Modification Example 2 (an example in which the side surface of the surrounding member is shaped to form two sides of a triangle)
4. Modification Example 3 (an example in which the right and the left sides and an upper side of the display cell are covered with the extended parts of the cover film)
5. Modification Example 4 (an example in which the upper side of the display cell is covered with the extended part of the cover film)
6. Modification Example 5 (an example in which, in the modification example 3, a corner of the surrounding member is covered with a concealment of the cover film)
7. Modification Example 6 (an example in which the display cell is curved in a rearward-protruded are shape)
8. Application Examples FIG. 1 illustrates an appearance, viewed from front (viewer's side), of a display device according to an example embodiment of the disclosure. The display device 1 may be used as, for example, a television set or a monitor device, and may have a configuration in which a plate-shaped display panel 2 is supported by a stand 3. An upper side and a lower side of the display panel 2 may be capped with decorative members 4. Speakers 5 may be disposed at right and left ends of the display panel 2.

Herein, viewed from front in front of the display panel 2, a horizontal direction (a rightward-leftward direction) is denoted as an X direction; a vertical direction (an upward-downward direction) is denoted as a Y direction; and a direction (a frontward-rearward direction, or a depthwise direction) orthogonal to the X direction and the Y direction is denoted as a Z direction.

In a front surface of the display panel 2, there may be provided a display region 2A and a frame region 2B (a rectangular frame-shaped region shaded in FIG. 1) around the display region 2A. The display region 2A is provided for image display. The speakers 5 may be disposed in the frame region 2B. Also, in the display panel 2, a cover film 10 common to the display region 2A and the frame region 2B is provided at a foremost surface. In this way, the display panel 2 has a so-called monolithic design in which the display region 2A and the frame region 2B from a continuous, integral screen. In such a monolithic design, the display region 2A is not physically divided by an outer frame (bezel). Hence, it is possible to create a sense of floating as if an image displayed in the display region 2A were floating in space. A detailed configuration of the cover film 10 is described later.

FIG. 2 illustrates the display panel 2 illustrated in FIG. 1 with the cover film 10 party torn off from an upper-left corner to allow an internal configuration to come into view. Inside the cover film 10, a display cell 20 may be provided. Around the display cell 20, a surrounding member 30 may be disposed.

The cover film 10 may include, for example, as illustrated in FIG. 3, a surface layer 11, a first adhesive layer 12, a main layer 13, and second adhesive layer 14, in this order from the front (the viewer's side).

The surface layer 11 may be made of, for example, TAC film. Moreover, the surface layer 11 may be provided with an anti-reflection coating layer (not illustrated). In the surface layer 11, a region corresponding to the frame region 2B may be subjected to black or dark-colored printing treatment, and may be shielded to prevent internal components from being seen through from outside. It is to be noted that in the surface layer 11, a region corresponding to the display region 2A may be transparent. The first adhesive layer 12 is adapted to bond the surface layer 11 and the main layer 13 together, and may be made of OCA (optical clear adhesive). The main layer 13 may be made of, for example, COC (cyclic olefin copolymer). The second adhesive layer 14 is adapted to bond the cover film 10 and the display cell 20 together, and may be made of OCA (optical clear adhesive).

The display cell 20 may include, for example, as illustrated in FIG. 3 as well, a polarization plate 21, and opposite substrate 22, a driver substrate 23, and a polarization plate 24, in this order form the front (the viewer's side). The driver substrate 23 may include, for example, on a glass substrate, a pixel driver circuit, a peripheral circuit, a pixel electrode, and an orientation film (neither illustrated). The pixel driver circuit may include, for example, a TFT (Thin Film Transistor) and a capacitor. The opposite substrate 22 may include, for example, on a glass substrate, an opposite electrode, a color filter, a black matrix, and an orientation film (neither illustrated). A liquid crystal layer (not illustrated) may be provided between the opposite substrate 22 and the driver substrate 23.

The cover film 10 may be attached to the polarization plate 21 of the display cell 20, as denoted by an arrow A1 in FIG. 3, by the second adhesive layer 14 of the cover film 10.

The surrounding member 30 as illustrated in FIG. 2 may be a member to be disposed in side-by-side relation to the display cell 20, with the cover film 10 attached thereto, forming a plane in the front surface of the display panel 2. By providing the surrounding member 30, it is possible to compensate strength of the cover film 10 in the frame region 2B, to enhance property of shape retention of the cover film 10, and to improve an appearance of the display panel 2. A preferred example of the surrounding member 30 may be a metal member. Use of a metal member allows for smaller weight and reduction in costs, as compared to glass. It is to be noted that there is no particular limitation on a material of the surrounding member 30; not only metal, but also plastics and glass may be possible. Examples of plastics may include resins for optical applications, e.g. COP (cycloolefin polymer) and COC (cyclic olefin copolymer). Alternatively, the surrounding member 30 may be made of a display cell such as liquid crystal. In this case, it is possible to provide image display not only in the display region 2A but also in the frame region 2B.

The surrounding member 30 may include, for example, as illustrated in FIG. 4, two vertical members 30A and two horizontal members 30B. The vertical members 30A may be provided along right and left sides of the display cell 20, from upper ends to lower ends. The horizontal members 30B may be provided, between the vertical members 30A, along upper and lower sides of the display cell 20. The vertical members 30A and the horizontal members 30B may be disposed in a rectangular frame shape that surrounds the display cell 20. The vertical members 30A each may have a side surface 30C. The side surface 30C may serve as a guide surface is wrapping the cover film 10 around the right and the left sides of the display panel 2, and may be a curved surface. There is no limitation on a curved shape or a curvature of the side surface 30C. Moreover, FIG. 4 illustrates a case in which the side surface 30C is curved; however, as described later, the side surface 30C is not limited to a curved surface. The horizontal members 30B each may be, for example, a strip-shaped plate member.

FIG. 5 illustrates a cross-sectional configuration, taken along a line V-V, of the display panel 2 illustrated in FIG. 1, that is, a cross-sectional configuration in vicinity of a margin M between the display cell 20 and the vertical member 30A. The cover film 10 may be attached to front side of the display cell 20 and the surrounding member 30 (or the vertical member 30A). On rear side of the display cell 20 and the surrounding member (or the vertical member 30A), a relay member 40 is provided. The relay member 40 is provided facing the margin M between the display cell 20 and the surrounding member 30 (or the vertical member 30A). Between the display cell 20 and the relay member 40, and between the surrounding member 30 (or the vertical member 30A) and the relay member 40, an adhesive layer 50 is provided. Thus, in the display device 1, it is possible to reduce deformities such as a level differences that occur in the margin M between the display cell 20 and the surrounding member 30 (or the vertical member 30A) when the cover film 10 is attached to the front surface of the display cell 20.

The relay member 40 and the adhesive layer 50 are adapted to fasten the display cell 20 and the surrounding member 30 together, and to enhance plurality of the front surface of the display panel 2. Moreover, the relay member 40 and the adhesive layer 50 may preferably have a buffer function of absorbing a difference between a linear expansion coefficient of the display cell 20 and a linear expansion coefficient of the surrounding member 30, reducing stress applied to the display cell 20, and reducing influences on image quality, e.g. display unevenness.

For this purpose, the relay member 40 may be preferable made of a material having a linear expansion coefficient close to a linear expansion coefficient of the display cell 20 (that may be mainly made of glass), specifically, one or more of a group consisting of glass, carbon, and a glass fiber. This makes it possible to restrain stress caused by a difference in expansion and contractions between the display cell 20 and the surrounding member 30 from being transmitted to the display cell 20, leading to reduction in the stress applied to the display cell 20.

Alternatively, the relay member 40 may preferably have a structure adapted to absorb the difference in expansion and contraction between the display cell 20 and the surrounding member 30. In one specific and preferred example, the relay member 40 may have a gap-including, extendable structure such as a honey-comb structure.

The adhesive layer 50 may be preferably made of, for example, an ultraviolet-curing resin (an UV resin). Moreover, the adhesive layer 50 may be preferably made of an elastic material. This makes it possible to allow the adhesive layer 50 to be deformed following expansion and contraction of the cover film 10, and to absorb the expansion and contraction of the cover film 10. Furthermore, by means of elastic deformation of the adhesive layer 50, it is also possible to absorb the difference in expansion and contraction between the display cell 20 and the surrounding member 30.

The adhesive layer 50 may preferably fill a recess R whose three sides are surrounded by a side surface of the display cell 20, a side surface of the surrounding member 30, and the cover film 10. This makes it possible to restrain more securely occurrence of deformities such as a level difference and wrinkle in the cover film 10 in the margin M between the display cell 20 and the surrounding member 30.

It is to be noted that, behind the relay member 40, a rear casing 60 and a backlight unit 70 may be provided. The rear casing 60 may include, for example, a back chassis 61 and a rear cover 62. The back chassis 61 may accommodate the backlight unit 70. The rear cover 62 may cover a rear surface of the back chassis 61. The back chassis 61 may be made of a metal plate such as aluminum (Al), and may be hooked on an attachment member 63, while being fixed to a rear surface of the backlight unit 70 by a screw 64. The attachment member 63 may be fixed to a rear surface of the relay member 40 by an adhesive layer (not illustrated). Between the attachment member 63 and the backlight unit 70, a cushion 65 may be disposed. The rear cover 62 may be made of a resin or a metal plate.

FIG. 6 illustrates a configuration of the cover film 10 illustrated in FIG. 1. The cover film 10 may include a front attachment part 10A and an extended part 10B outside the front attachment part 10A. The front attachment part 10A may be attached to the display cell 20 and the surrounding member 30 (i.e., the vertical members 30A and the horizontal member 30B). The extended part 10B may preferably extend along the surrounding member 30 (or the side surface 30C of the vertical member 30A) to the rear side of the display cell 20, as illustrated in FIG. 5. This makes it possible to cover and decorate the right and the left sides of the display panel 2 with the cover film 10, and to provide potential in terms of design such as a smooth curved surface shape and a slithering, glossy appearance, as compared to a case with use of a highly rigid material such as glass. Moreover, it is possible to eliminate the decorative member 4 on the right and left sides, and to enhance the sense of a floating picture provided by the monolithic design as described above.

In one specific example, the extended part 10B of the cover film 10 may be guided to the rear side of the display cell 20, with the curve side surface 30C of the vertical member 30A serving as a guide surface, and may be coupled to the rear surface of the rear casing 60.

The extended part 10B may be preferably relatively movably coupled to the rear casing 60 by a movable coupling section 80. This makes it possible to allow the extended part 10B to be displaced following the expansion and contraction of the cover film 10. It is therefore possible to restrain the repetitive expansion and contraction of the cover film 10 from causing degradation in an appearance of the display panel 2 such as a wrinkle in the margin M between the display cell 20 and the surrounding member 30.

In one specific example, the movable coupling section 80 may include a screw 81 and a spring 82, for example, as illustrated in FIG. 5. The screw 81 may couple the extended part 10B to the rear casing 60. The spring 82 may energize the screw 81 in a direction in which the extended part 10B is pulled toward the rear side of the display cell 20 (that is, a direction denoted by an arrow A2). This makes it possible to apply tension to the extended part 10B of the cover film 10, and to pull the extendable part 10B toward the rear side of the display cell 20. It is therefore possible to restrain securely the repetitive expansion and contraction of the cover film 10 from causing occurrence of deformities such as a wrinkle in the margin M between the display cell 20 and the surrounding member 30.

It is to be noted that the screw 81 may be provided, for example, between a strip-shaped member 83 and the rear cover 62 of the rear casing 60, and may be screwed with the rear cover 62. The strip-shaped member 83 may be attached to an end of the extended part 10B. The spring 82 may be provided, for example, between a head of the screw 81 and the strip-shaped member 83. It is to be noted that the screw 81 may be provided between the strip-shaped member 83 and an attachment part (not illustrated) provided on the rear surface of the back chassis 61, and may be screwed with the attachment part. Moreover, the movable coupling section 80 is not limited to the configuration including the screw 81 and the spring 82, but may have other configurations as long as the movable coupling section 80 is adapted to apply tension to the extended part 10B.

FIG. 7 illustrates a cross-sectional configuration, taken along a line VII-VII, of the display panel 2 illustrated in FIG. 1, that is, a cross-sectional configuration in vicinity of the margin M between the display cell 20 and the horizontal member 30B. In the cross-sectional configuration in this part, the horizontal member 30A includes no side surface 30C, and neither extended part 10B of the cover film 10 nor movable coupling section 80 are provided. Otherwise, the cross-sectional configuration in this part is similar to the cross-sectional configuration in the vicinity of the margin M between the display cell 20 and the surrounding member 30 (or the vertical member 30A) as described with reference to FIG. 5.

FIG. 8 illustrates a configuration of the backlight unit 70. The backlight unit 70 may include, for example, optical sheets 71, a reflection member 72, a light guide plate 73 and light sources 74, a reflection sheet 75, and a heat spreader 76, in this order from the front (the viewer's side). The backlight unit 70 may be, for example, an edge-light type in which the light sources 74 are arranged along the lower side of the display cell 20. However, there is no particular limitation on positions of the light sources 74. Moreover, the backlight unit 70 is not limited to the edge-light type, but may have other configurations.

The optical sheets 71 may include, for example, a diffusion sheet and a luminance-enhancement film. The reflection member 72 may be a frame-shaped member (a so-called middle chassis) adapted to support the optical sheets 71 and other components, and may be made of a resin having high reflectivity such as white-colored polycarbonate. The light guide plate 73 may be made of, for example, acryl (PMMA). The light sources 74 may include light emitting elements such as LEDs (Light Emitting Diodes). The reflection sheet 75 is adapted to allow light from the light sources 74 to be reflected toward the display cell 20, and may be made of, for example, a white-colored resin plate. The heat spreader 76 may be made of, for example, aluminum (Al).

The display device 1 may be assembled, for example, as follows. First, the backlight unit 70 and the display cell 20 may be accommodated in the rear casing 60. The surrounding member 30 may be disposed around the display cell 20. The front attachment part 10A of the cover film 10 may be attached to the display cell 20 and the surrounding member 30. The extended part 10B may be wrapped around the surrounding member 30 toward the rear side of the display cell 20. The end of the extended part 10B may be attached to the rear casing 60 with use of the movable coupling section 80. In this way, the display panel 2 may be formed. The stand 3 may be placed on an installment surface. The display panel 2 may be mounted on the stand 3, and may be fixed with, for example, a screw (not illustrated).

In the display device 1, the relay member 40 is provided behind the display cell 20, facing the margin M between the display cell 20 and the surrounding member 30. The adhesive layer 50 is provided between the relay member 40 and the display cell 20, and between the relay member 40 and the surrounding member 30. In this way, the display cell 20 and the surrounding member 30 are fastened together by the relay member 40 and the adhesive layer 50. This leads to reduction in deformities such as a level difference that occur in the margin M between the display cell 20 and the surrounding member 30. Moreover, the difference in the expansion and contraction between the display cell 20 and the surrounding member 30 is buffered by the relay member 40 and the adhesive layer 50. This causes a decrease in strength applied to the display cell 20, restraining influences on the image quality, e.g. display unevenness.

As described, in the example embodiment, the relay member 40 is provided behind the display cell 20, facing the margin M between the display cell 20 and the surrounding member 30. The adhesive layer 50 is provided between the relay member 40 and the display cell 20, and between the relay member 40 and the surrounding member 30. Hence, it is possible to reduce deformation such as a level difference that occur in the margin between the display cell 20 and the surrounding member 30.

Modification Examples 1 and 2

It is to be noted that, in the forgoing example embodiment, description is given on a case in which the side surface 30C of the surrounding member 30 is a curved surface. However, the side surface 30C of the surrounding member 30 is not limited to a curved surface, but may have other shapes. For example, as illustrated in FIG. 9, a possible alternative may be a shape that forms three sides of a rectangle with rounded corners. In another alternative, as illustrated in FIG. 10, the side surface 30C of the surrounding member 30 may be shaped to form two sides of a triangle.

Modification Example 3

Moreover, in the foregoing example embodiment, description is given on a case in which the extended parts 10B of the cover film 10 are wrapped around the right and the left sides of the display panel 2. However, as illustrated in FIG. 11, the cover film 10 may be wrapped around three sides, i.e., the right and the left sides and the upper side of the display panel 2. In this case, as illustrated in FIG. 12, the cover film 10 may have the extended parts 10B on its three sides. The extended parts 10B may be extended outwardly from upper, right, and left edges of the front attachment part 10A. A slanted edge 10C may be provided at both right and left edges or at an upper end on outer side of the extended part 10B. The slanted edge 10C may be slanted obliquely at an angle 45°.

With the cover film 10 attached, as illustrated in FIG. 13, at a corner 30D of the surrounding member 30, the slanted edges 10C of the adjacent extended parts 10B may be adjacent to or in contact with each other on the rear-surface side of the rear casing 60.

Modification Example 4

Alternatively, as illustrated in FIG. 14, the cover film 10 may be wrapped around only the upper side of the display panel 2. In this case, the decorative members 4A may be provided on the right and the left sides on the display panel 2.

Modification Example 5

FIG. 15 illustrates a configuration of the cover film 10 according to a modification example 5. In the modification example, in the cover film 10 according to the modification example 3, each of the extended parts 10B may be provided with a concealment part 10D. The concealment part 10D is adapted to cover the corner 30D (refer to FIG. 13) of the surrounding member 30. The corner 30D is exposed in a gap between edges of the adjacent extended parts 10B. The concealment part 10D may be protruded along the edge of the adjacent extended part 10B. A width of the concealment part 10D may be equal to or substantially equal to a width of the side surface 30C of the surrounding member 30.

FIGS. 16 to 18 illustrate an attachment method of the cover film 10, in order of a procedure. First, as illustrated in FIG. 16, the two extended parts 10B may be adjacent to each other with the corner 30D of the surrounding member 30 in between. One of the two extended parts 10B may be folded and attached to the side surface 30C of the surrounding member 30. Also, the concealment part 10D may be attached to the corner 30D of the surrounding member 30.

Next, as illustrated in FIG. 17, the other of the extended parts 10B adjacent to each other with the corner 30D of the surrounding member 30 in between may be folded and attached to the side surface 30C of the surrounding member 30. At this occasion, part of the second-folded extended part 10B may be attached in overlaid relation to the concealment part 10D that has been already attached to the corner 30D.

Thus, all the extended parts 10B are folded. Thereafter, as illustrated in FIG. 18, the extended parts 10B may be attached to the rear surface of the rear casing 60.

In the modification example, each of the extended parts 10B may be provided with the concealment part 10D. The corner 30D of the surrounding member 30 may be covered with the concealment part 10D. Hence, it is possible to avoid exposure of the corner 30D of the surrounding member 30, attaining enhanced designability of the display device 1.

Modification Example 6

FIG. 19 illustrates an appearance, viewed from front, of a display device according to a modification example 6. In the display device 1C, the display cell 20 may be curved in a rearward-protruded arc shape. In this way, as illustrated in FIG. 20, when viewed from front, the display cell 20 is visually recognized to be gradually narrower from right and left end parts toward a center part. It is therefore possible to give a sense of unity and immersion by a visual effect of perspective. Otherwise, the display device 1C may have similar configurations, workings, and effects to those of the display device 1 according to the foregoing example embodiment.

Application Examples

In the following, description is given on application examples of the display device according to the above-described example embodiment with reference to FIGS. 21 to 23. The display device according to the above-described example embodiment may be applied to an electronic apparatus in various fields, for example, desktop, notebook, or tablet computers, a monitor device of a game machine, a digital signage, a mobile terminal device such as a mobile phone, a smart phone, an electronic book reader, and a portable music player, as well as a television set.

Application Example 1

FIG. 21 illustrates an appearance of a tablet computer 110 that includes the display device according to the forgoing example embodiment. The tablet computer 110 may include the display panel 2 according to the example embodiment as described above, in which the display region 2A may serve as a touch panel section 111. In the frame region 2B, a luminance sensor 112 and a front camera 113 may be provided. Speakers 5, a power source key, a microphone, and various operation buttons (neither illustrated) may be disposed on side surfaces. A main camera (not illustrated) may be provided on a rear surface.

The tablet computer 110 may include the cover film 10 that includes the extended parts on its four sides, as illustrated in FIG. 22. The extended parts 10B of the cover film 10 may be wrapped around four sides of the display panel 2. It is to be noted that the extended parts 10B of the cover film 10 may be wrapped around only the right and the left sides, or only the upper and the lower sides of the tablet computer 110, as in the forgoing example embodiment.

Application Example 2

FIG. 23 illustrates and appearance of a smart phone 120 that includes the display device according to the above-described example embodiment. The smart phone 120 may include the display panel 2 according to the example embodiment as described above, in which the display region 2A may serve as a touch panel part 121. In the frame region 2B, operation buttons 122 may be provided in a lower part, while an ear piece 123 and sensors 124 may be provided in an upper part. The sensors 124 may include, for example, a proximity sensor and luminance sensor. A power button 124 may be provided on a side surface. A camera (not illustrated) may be provided on a rear surface.

Similarly to the application example 1, the smart phone 120 may include the cover film 10 that includes the extended parts 10B on its four sides, as illustrated in FIG. 22. The extended parts 10B of the cover film 10 may be wrapped around the four sides of the display panel 2. It is to be noted that the extended parts 10B of the cover film 10 may be wrapped around only the right and the left sides, or only the upper and the lower sides of the smart phone 120, as in the forgoing example embodiment.

Although description has been made by giving the example embodiments as mentioned above, the contents of the technology are not limited to the above-mentioned example embodiments and may be modified in a variety of ways. For example, although the cover film 10 may be directly attached to the side surface 30C of the surrounding member 30, an auxiliary film may be interposed between them. Also, an additional optical functional film may further be attached to the cover film 10.

Moreover, for example, in the foregoing example embodiment, description has been given on specific configurations of the display device 1. However, the display device 1 is not limited to a display device that includes all the components as illustrated in the figures. Moreover, part of components may be replaced with another component or other components.

Furthermore, stacked structures, shapes, dimensions, materials or other properties of the cover film 10 as described in the forgoing example embodiments are not limited to as exemplified above, but other stacked structures, shapes, dimensions, and materials may be adopted.

In addition, the display cell 20 may be any other display cell than a liquid crystal cell, e.g. an organic EL (Electroluminescence) cell, an electrophoretic display cell, an inorganic EL cell, and an electrodeposition or electrochromic display cell.

It is to be noted that effects described herein are merely exemplified and not limitative, and effects of the disclosure may be other effects or may further include other effects.

The contents of the technology may have the following configurations.

(1)

A display device, including:

a display cell;

a surrounding member provided around the display cell;

a cover film provided on front side of the display cell and the surrounding member;

a relay member provided on rear side of the display cell and the surrounding member, and facing a margin between the display cell and the surrounding member; and an adhesive layer provided between the display cell and relay member, and between the surrounding member and the relay member.

(2)
The display device according to (1),
wherein the relay member is made of one or more of a group consisting of glass, carbon, and glass fiber.

(3)
The display device according to (1) or (2),
wherein the adhesive layer is made of an elastic material.

(4)
The display device according to any one of (1) to (3),
wherein the relay member has a configuration adapted to absorb a difference in expansion and contraction between the display cell and the surrounding member.

(5)
The display device according to any one of (1) to (4),
wherein the adhesive layer fills a recess whose three sides are surrounded by a side surface of the display cell, a side surface of the surrounding member, and the cover film.

(6)
The display device according to any one of (1) to (5),
wherein the cover film includes a front attachment part and an extended part outside the front attachment part, the front attachment part being attached to the display cell and the surrounding member, and the extended part being extended along the surrounding member toward the rear side of the display cell.

(7)
The display device according to (6), further including:
a rear casing provided on the rear side of the display cell and the surrounding member; and
a movable coupling section adapted to relatively movably couple the extended part to the rear casing.

(8)
The display device according to (7),
wherein the movable coupling section includes:
a screw that couples the extended part to the rear casing; and
a spring that energizes the screw in a direction in which the extended part is pulled toward the rear side of the display cell.

(9)
The display device according to any one of (1) to (8),
wherein the display cell is curved in a rearward-protruded arc shape.

This application claims the benefit of Japanese Priority Patent Application JP 2013-264895 filed on Dec. 24, 2013 the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A display device, comprising:
a display cell;
a surrounding member around the display cell;
a margin between the display cell and the surrounding member;
a cover film on a front side of the display cell, the margin, and the surrounding member;
a relay member on a first rear side of the display cell and on a second rear side of the surrounding member, wherein the relay member faces the margin; and
an adhesive layer,
wherein a first portion of the adhesive layer is between the first rear side of the display cell and the relay member,
wherein a second portion of the adhesive layer is between the second rear side of the surrounding member and the relay member,
wherein the adhesive layer fills a recess between the display cell and the surrounding member, and
wherein three sides of the recess are surrounded by a first side surface of the display cell, a second side surface of the surrounding member, and the cover film.

2. The display device according to claim 1,
wherein the relay member comprises at least one of glass, carbon, or glass fiber.

3. The display device according to claim 1,
wherein the adhesive layer comprises an elastic material.

4. The display device according to claim 1,
wherein the relay member has a configuration to absorb a difference in expansion and contraction between the display cell and the surrounding member.

5. The display device according to claim 1,
wherein:
the cover film includes a front attachment part and an extended part outside the front attachment part,
the front attachment part is attached to the front side of the display cell and the surrounding member, and
the extended part is extended along the surrounding member towards a third rear side of the display cell.

6. The display device according to claim 5, further comprising:
a rear casing on the third rear side of the display cell and a fourth rear side of the surrounding member; and
a movable coupling section configured to relatively movably couple the extended part of the cover film to the rear casing.

7. The display device according to claim 6,
wherein the movable coupling section includes:
a screw that couples the extended part of the cover film to the rear casing; and
a spring that energizes the screw in a first directions which is same as a second direction in which the extended part of the cover film is pulled toward the third rear side of the display cell.

8. The display device according to claim 1,
wherein the display cell is curved in a rearward-protruded arc shape.

* * * * *